United States Patent [19]

Bulle

[11] Patent Number: 4,685,854

[45] Date of Patent: Aug. 11, 1987

[54] HAND CART

[76] Inventor: Marshall R. Bulle, P.O. Box 2576, Silver City, N. Mex., 88062

[21] Appl. No.: 775,266

[22] Filed: Sep. 12, 1985

[51] Int. Cl.$^4$ .............................................. B62B 1/06
[52] U.S. Cl. ................................ 414/452; 280/47.24; 414/917
[58] Field of Search ............... 414/490, 450, 451, 452, 414/917; 280/47.24

[56] References Cited

U.S. PATENT DOCUMENTS

| | | | |
|---|---|---|---|
| 990,187 | 4/1911 | Bergsather | 414/452 |
| 990,402 | 4/1911 | Stebler | 414/451 |
| 1,551,928 | 9/1925 | Bryan | 414/452 |
| 1,795,856 | 3/1931 | Gravatt | 414/451 |
| 2,062,498 | 12/1936 | Byington | 414/451 |
| 2,129,772 | 9/1938 | Jones | 414/451 |
| 2,475,874 | 7/1949 | Bartlett | 414/452 |
| 3,084,820 | 4/1963 | Malo | 414/450 X |

Primary Examiner—Robert J. Spar
Assistant Examiner—Stuart J. Millman
Attorney, Agent, or Firm—Merchant, Gould, Smith, Edell, Welter & Schmidt

[57] ABSTRACT

A hand cart particularly adapted for carrying a stack of material such as tires, barrels and the like utilizing a pair of arms activated by foot pedals to open and close the arms. The foot pedal mechanism is arranged such that the pedals will always be horizontal during the opening or closing of the arms. Two horizontal projections from the end of each arm provide horizontal support of material to be moved. The projections from the arms are scalloped to minimize friction during engagement. No adjustments for material size are required in the use of this device. The arms are arranged to have the maximum length possible to minimize the opening angle to reduce interference with adjacent stacks.

12 Claims, 4 Drawing Figures

HAND CART

BACKGROUND OF THE INVENTION

I. Field of the Invention

This invention relates generally to a device which permits an operator to load and unload a stack of material using foot pedals to activate holding arms with the arms having projections which are forced under the stack for vertical support. Unloading is essentially the converse of this operation with operator foot power releasing both the arms and the projections from the stack. A second set of horizontal projections within the arms support the rear of the arms and are covered with Teflon to minimize friction during engagement.

II. Description of the Prior Art

There is disclosed in the prior art a number of hand carts and trucks for moving materials. For example, reference is made to Bergsather, U.S. Pat. No. 990,187 where a hand truck utilizes a gripping nose piece which can be swung into and out of operative position for storage or for use. In Bryan, U.S. Pat. No. 1,551,928 a hand truck utilizes a pair of gripping jaws which are operated by a handle to bring the jaws to the approximate size of the load and when the truck is returned to horizontal a linkage automatically causes the jaws to firmly grip the material. In Bartlett, U.S. Pat. No. 2,475,874, a hand truck utilizes a pair of foot pedals affixed to an arm to close a pair of gripping arms to a preadjusted distance where they are locked in position by an offcenter arrangement. Cylindrical shaped projections on the inside of the arms provide lugs which mate with recesses in crates containing the material to be moved.

None of these devices address the instant problem of providing a hand cart which will grip material with no preadjustment being required, with supporting means on two sides of the material in addition to the gripping arms and providing foot pedals which are always horizontal to maximize the force transmitted. The arms are arranged to have the maximum possible length to minimize the angular opening and thus reduce interference with adjacent material.

SUMMARY OF THE PRESENT INVENTION

This device is particularly useful in transporting a generally circular shaped stack of material such as tires, barrels or the like. The hand truck itself is arranged for simplicity of construction, mechanization and use. A pair of handles are provided by a U-shaped extension of the truck itself to provide a sturdy grip a maximum distance from wheels which provide both mobility and a pivot point for the bed. Curved spacers connect the U-shaped sides of the bed which results in a bed with a great deal of strength and a minimum of structure which also match loaded material with a circular cross-section.

In loading or unloading the bed is rotated about the wheels to a vertical attitude which then presents a pair of horizontal pivoting arms at ground level in the front and a pair of foot pedals on the rear for the operator to control the arms. Depressing one pedal with a foot opens the arms while a second pedal closes them. The pivot points for the arms are located as far rearward as possible to minimize the angle the arms must be opened to grip a stack of material to be transported, this minimizing interference with adjacent stacks to permit dense storage. The foot pedals are arranged to always be horizontal as the arms are opened and closed to maximize the force transmitted by the foot which acts in a vertical direction.

The arms each have a projection toward the other arm which are horizontal and next to the ground when the truck bed is vertical. These projections are forced under the stack by a foot pedal to provide support in lifting the material. The projections are scalloped to minimize the friction in this part of the loading process.

A second pair of fixed horizontal projections are provided within the arms near their pivot points in the same plane as those on the arms. To load a stack, the bed is rotated to a vertical-attitude which lowers the arms and the horizontal projections to ground level, the arms are opened by a foot pedal and the horizontal projections forced under the stack by pushing the truck forward towards the stack. The upper surface of the horizontal projections have a Teflon surface to minimize friction in rotating the arms.

The arms are closed by the other foot pedal to force the scalloped horizontal projections on the arms under each side of the stack to provide vertical support. There are no locks or adjustments required to size the arms to the stack as the arms are held in place by the weight of the stack and the friction between the stack and the scalloped projections.

After loading, the truck bed is pivoted about the wheels to a near horizontal attitude and the stack transported by the wheels and the operator lifting and pushing on the two handles. With the stack relocated the truck bed is again lifted to a vertical attitude by the handles pivoting the bed about the wheels, the arms are opened by a foot pedal and the truck pulled rearward. The truck bed can then be lowered to a near horizontal position to be moved for further use.

DETAILED DESCRIPTION OF PREFERRED EMBODIMENTS

Figure 1:
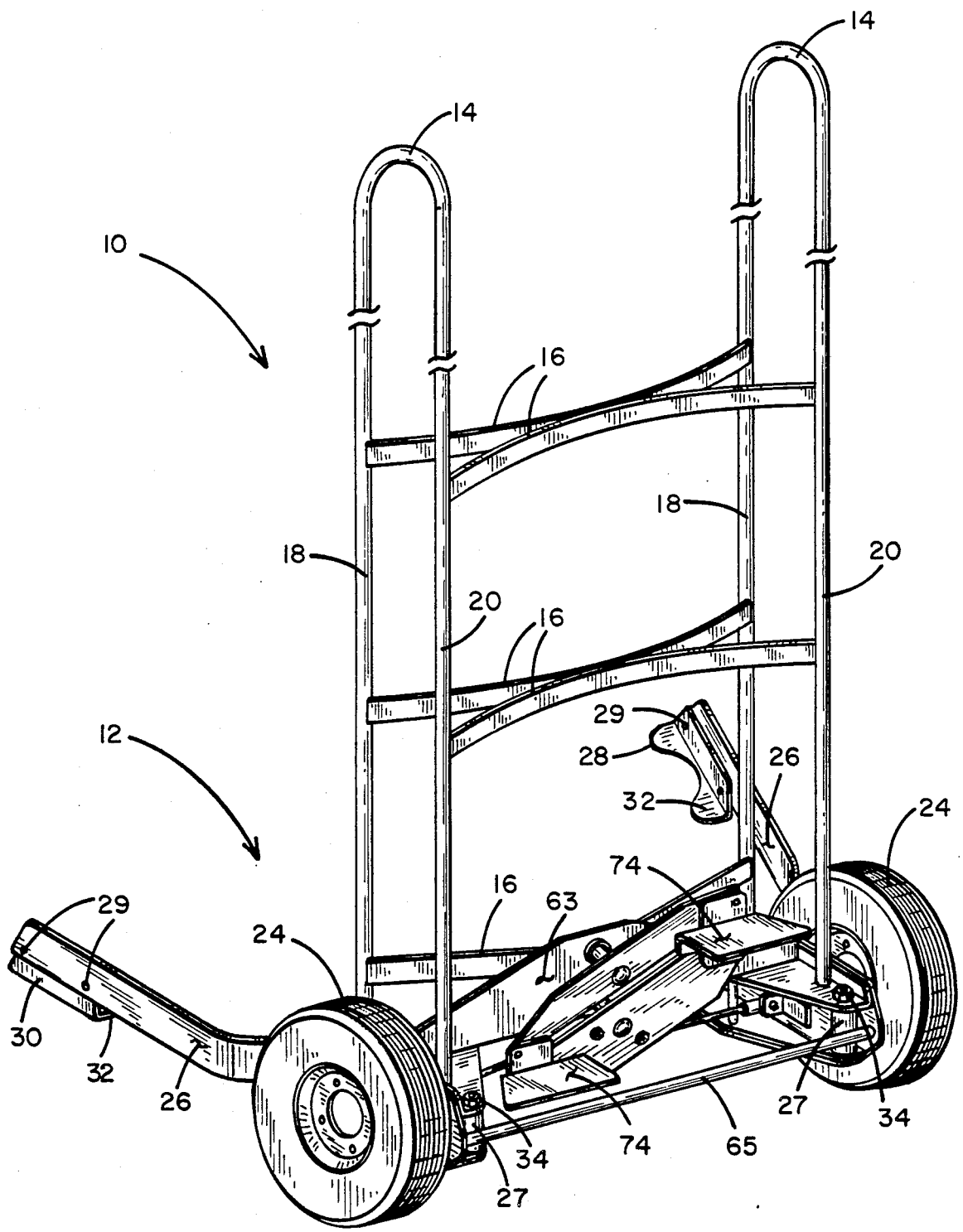
FIG. 1 is an isometric rear view of the device with the bed in an orientation for loading stock.

Referring first to FIG. 1, an overview of the hand cart 10 is shown oriented perpendicular to the ground in an attitude for loading or unloading. U-shaped handles 14 on each side extend the full length of hand cart 10 to form a bed 12 and are attached to each other by five welded equal length curved spacers 16. Handles 14 each terminate in two extensions 18 and 20. This configuration provides a great deal of structural strength with a minimum number of parts and also provides a grip handle 14 at the extremity.

Two wheels 24 provide mobility for the hand cart 10. Two arms 26 each terminating in a gripper 28, provide a holding means for stock to be transported.

The side of hand cart 10 in FIG. 1 with the arms is considered the front of the cart while the opposite side with the pedals is considered the rear side. Right and left refers to the view depicted in this and the other figures.

Grippers 28, one on each arm 26, are attached to the arms by means of two rivets 29 through two aligned holes of the proper size in each part. Grippers 28 have two right angle surfaces with surface 30 in the plane of arm 26 and the other surface 32 at right angles. Planes 32 extending inward toward each other have the inner edge scalloped, the purpose of which will be described later. Arms 26 are formed into a circular shape at the ends 27 opposite grippers 28 to encircle bolts 34 and provide a pivot point at a maximum distance in order to minimize the arc arms 26 must swing through to enclose any stock to be transported.

Figure 2:
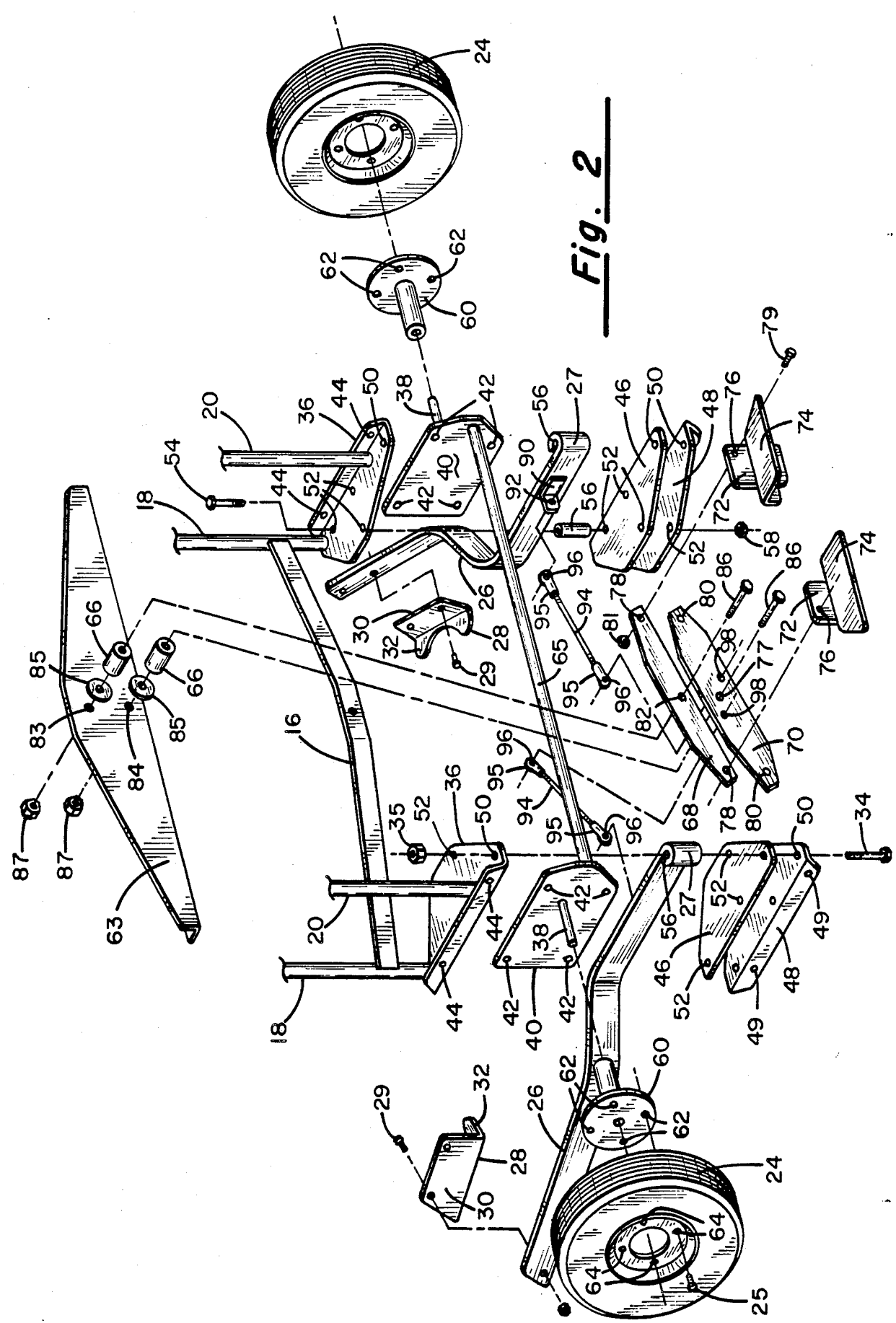
FIG. 2 is an exploded isometric rear view of the moving parts of the device with the bed oriented in a position for loading.

In FIG. 2 the parts making up the moving parts of hand cart 10 and associated supporting structure can be seen. Two bottom plates 36 are welded to the ends of right and left extensions 18 and 20. Two axles 38 are attached to axle plates 40. Axle plates 40 each have four holes 42. Two holes 44 in each portion of bottom plates 36 in the plane of axle plate 40 are of the proper size and spacing to align with the upper two holes 42 in the respective axle plate and these two parts on each side are secured to each other by nuts and bolts, not shown, through these holes.

Two Teflon plates 46, one on each side, are mounted above two supporting plates 48. Plates 46 and 48 are the same horizontal shape and size as plates 36 but plates 46 have a vertical edge projecting downward. Two holes 49 in each portion of bottom plates 48 in the plane of axle plates 40 are of the proper shape and size to align with the lower two holes 42 in their respective axle plate and these two parts on each side are secured to each other by nuts and bolts, not shown, through these holes.

Plates 36, 46, and 48 on each side all have a hole 50 which are aligned respectively with each other on both sides and are of the proper size to receive bolts 34. Three other holes 52 in plates 36, 46, and 48 are likewise aligned on each side and are of the proper size to receive three bolts 54, only one of which is shown in this figure. Six spacers 56, one of which is shown in this figure, provide spacing between plates 36 and 46. Plates 36, 46, and 48 and spacers 56 are secured together by six bolts 54 through plate 36, spacer 56, plate 46 and plate 48 through all three sets of aligned holes on each side and are secured together by nuts 58, only one of which is shown on this figure.

A bolt 34 on the left side extends through hole 50 in bottom plate 48, through hole 50 in Teflon plate 46, through hole 56 in arm 26, through hole 50 in bottom plate 36 and is secured by a nut 35. A similar bolt, not shown, through holes 50 in plate 48, and plate 46, hole 56 in arm 26 and hole 50 in bottom plate 36 on the right side secures those corresponding parts together and is held by a nut, not shown. Bolts 34 provide a pivot point for arms 26. Wheels 24 are attached to hubs 60 by four bolts 25, one of which is shown, through four holes 62 in the hubs and four matching aligned holes 64 in wheels 24. Holes 62 are threaded to secure bolts 61. Two cotter keys, not shown, through holes perpendicular to the ends of axles 38, secure hubs 60 in place.

A spacer plate 63 has a lower outer portion bent forward right angles to the upper and is welded on each end to the top surface of left and right bottom plates 36 respectively. A rod 65 is likewise welded on each end to the inside of left and right axle plates 40.

Two spacers 66 provide an offset from spacer plate 63 for an upper link 68 and a lower link 70. Two coupler plates 72 each have a foot pedal 74 welded perpendicular to their respective front surface plates and parallel to their upper edge. Coupler plates 72 each have two equal size perpendicularly aligned holes 76, one at the top and one at the bottom, not shown. Two holes 78 at each end of upper link 68 and two holes 80 at each end of lower link 70 are the same size as holes 76. The dimensions of upper link 68, lower link 70 and left and right coupler plates 72 and their respective holes are such that when holes 78 in upper link 68 and holes 80 in lower link 70 are parallel, holes 78 can be aligned with upper holes 76 in left and right coupler plates 72 and holes 80 will also align with lower holes 76 in the coupler plates. Four bolts 79 and nuts 81, only one of which is shown, are attached through these four pairs of aligned holes to pivotably attach upper link 68, lower link 70, and the two coupler plates 72 together in the general shape of a parallelogram. A center hole 77 in lower link 70 and a center hole 82 in upper link 68 and an upper hole 83 and lower hole 84 both along the centerline of spacer plate 63 are the same size and spacing as holes 82 and 77 when the upper and lower links are joined together by coupler plates 72. Two washers 85 have a center hole the same size as holes 83 and 84. The center hole of spacers 66 are likewise the same size as the center hole of washers 85. One bolt 86 and nut 87 are connected through center hole 82 in upper link 68, a spacer 66, a washer 85 and upper center hole 83 in spacer plate 63 to be secured by a nut 87 while the other bolt 86 and nut 87 is connected through center hole 77 in lower link 70, a spacer 66, washer 85 and lower center hole 84 in spacer plate 63 to be secured by a nut 87 to pivotably connect the upper and lower links to the spacer plate.

Two right angle brackets 90, one of which is shown, are welded to the inner portion of right and left arms 26 with the perpendicular projections directed toward each other and the projections each having a hole 92. A right and left connecting link 94 have ends 95 which are threaded onto the links with a right and left thread on opposite ends of each link to form a turn buckle to provide a length adjustment. Each link 95 has a hole 96. Two holes 98 of the same size are spaced an equal distance from the center hole 77 on an angle with respect to the upper surface of lower link 70 and are the same size as holes 92 in link ends 95. Holes 96 have an interior concave surface in the shape of a sphere to mate with a spherical end of a bolt, not shown, to provide a rotational and two angular degrees of freedom with these bolts which are of the proper size to mate both with holes 98 in lower link 70 and holes 92 in brackets 90 to connect left connecting link 94 to left bracket 90 and left hole 98 in lower link 70 and right connecting link to right bracket and right hole 98 in the lower link to provide a flexible coupling. This linkage translates an angular change in lower link 70 into an angular change in arms 26.

Figure 3A:
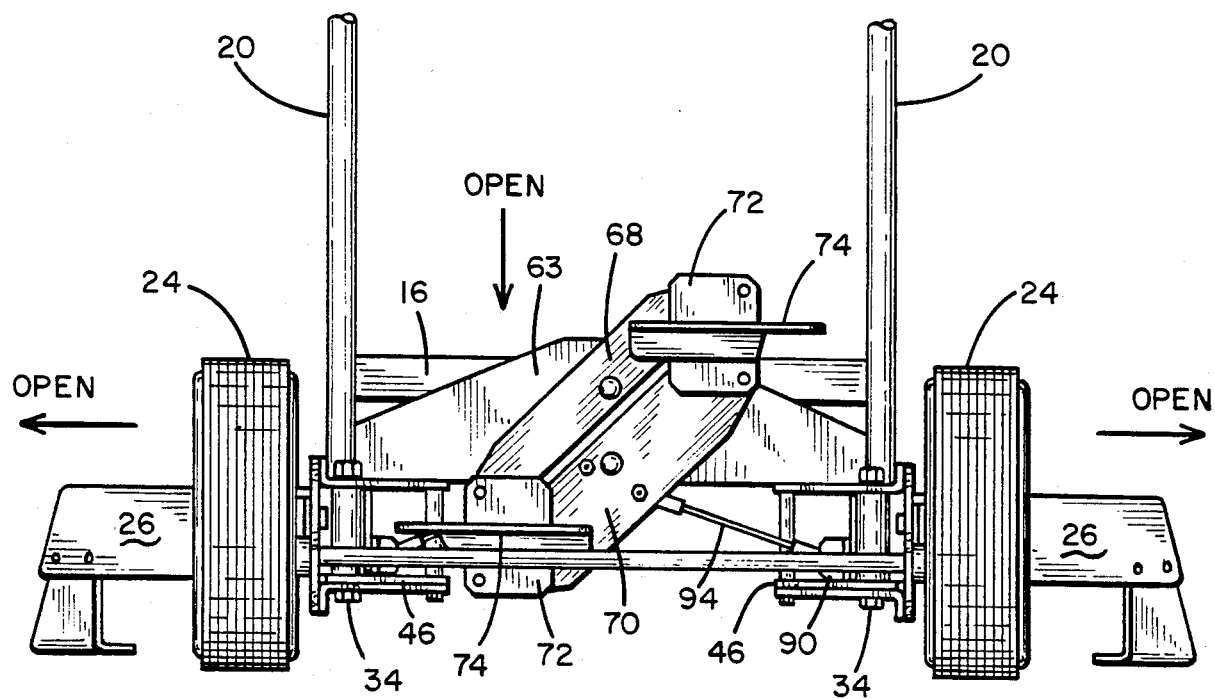
FIG. 3 is a back view of the moving parts of the device oriented for loading with the arms open.
FIG. 3b is a back view of the moving parts of the device oriented for loading with the arms closed.

Referring to FIG. 3a, lower link 70 is rotated to its maximum counterclockwise angle by stepping on left foot pedal 74 which forces the left end of the link downward which rotates the link counterclockwise and by acting through left and right connecting links 94 and left and right brackets 90 pushes left and right arms 26 outward to their open position. Both arms 26 are supported by Teflon plates 46 which reduce the friction in rotating the arms. Since lower link 72, upper link 68, along with left and right coupler plates 72 form a parallelogram the upper link will be rotated through the same angle as the lower link which results in the coupler plates maintaining their initial attitude during this rotation which, in turn, will maintain left and right foot pedals 74 in a horizontal attitude. This results in the full force of the foot pressure being directed downward which will minimize the force required to rotate upper link 68 and lower link 70.

Figure 3B:
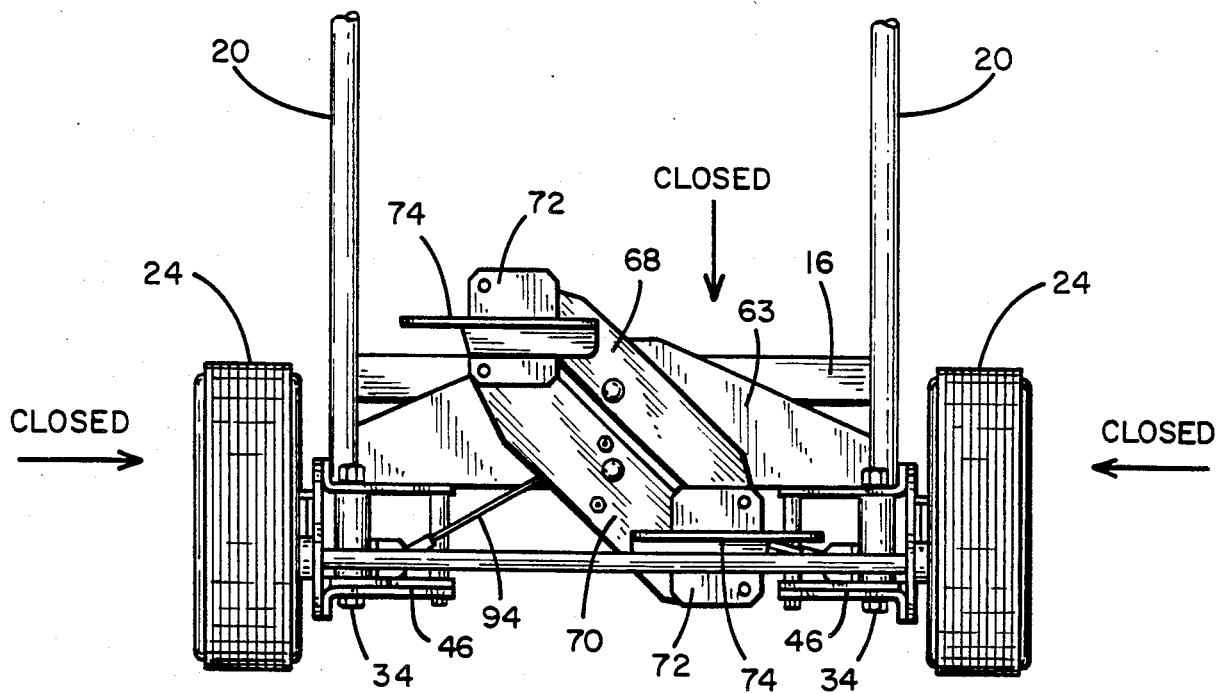

In FIG. 3b lower link 70 is shown rotated to its maximum clockwise angle accomplished by stepping on the right foot pedal 74 which forces the rightward end of link 70 down and at the same time pulls right and left links 94 toward the center which again acts through right angle connectors 92 pulling arms 26 to their closed position.

In use, to move the hand cart 10 handles 14 are pulled downward to rotate bed 12 to a near horizontal attitude to permit the operator to push the cart to a stack of material to be moved. Referring to FIG. 3a, the cart is then rotated such that arms 26 are adjacent to the ground. Left foot pedal 74 is then pushed downward by the operator's foot to open arms 26 to the position shown. The cart is then pushed forward by the operator to position arms 26 around the stack. The operator can then press the rightmost foot pedal 74 downward, as shown in FIG. 3b, to close the arms 26 about the stack and also slide projections 32 under the stack of material to be moved. Arms 26 will be held in this position by the friction between the stack of material and these projections.

Hand cart 10 can then be rotated horizontally to permit the operator to move the hand cart to a new location where the operator can again elevate the handles to a vertical position and release the arms from material by pressing left foot pedal 74 to the position shown in FIG. 3a and then pull the hand cart back to clear the material.

No adjusting mechanism or securing means are required in the operation of this hand cart. All power is provided manually by the operator. The construction is extremely simple and reliable with the only adjustment the length of connecting links 94.

What is claimed is:

1. A hand cart having a frame with wheel means mounted thereon and including a pair of first and second side arms mounted pivotably to said frame, an improvement comprising:
   means rotatably coupled to said frame and to said side arms for translating an indiced vertical force to a vertical pivotable force and then translating said vertical pivotable force to a horizontal force at said side arms, whereby said side arms may rotatably be brought to bear against objects placed therebetween;
   said means including a force transmitting means having a first pivot link pivotably mounted to said frame to pivot about a first link axis generally perpendicular to a pivot axis of said arms, a second link pivotably mounted to said frame to pivot about a second link axis generally parallel and spaced from said first link axis, force receiving means pivotably connecting said first and second links for said links to pivot simultaneously between first and second positions with a first fixed point of attachment on one of said links moving toward and from said first arm as said links move between said first and second positions and with a second fixed point of attachment on one of said links moving toward and from said second arm;
   first rigid connecting means having a first end pivotably connected to said first point of attachment and a second end pivotably connected t said first arm; and
   second rigid connecting means having a first end pivotably connected to said second point of attachment and a second end pivotably connected to said second arm.

2. A hand cart having a frame and wheel means mounted on said frame, said cart comprising:
   a first side arm pivotably mounted to said frame to pivot about a first arm axis;
   a second side arm pivotably mounted to said frame to pivot about a second arm axis generally parallel to said first arm axis;
   a force transmitting means having a first link pivotably mounted to said frame to pivot about a first link axis generally perpendicular to said arm axes, a second link pivotably mounted to said frame to pivot about a second link axis generally parallel to and spaced from said first link axis, force receiving means pivotably connecting said first and second links for said links to pivot simultaneously between first and second positions with a first fixed point of attachment on one of said links moving toward and away from said first arm as said links move between said first and second positions and a second fixed point of attachment on one of said links moving towards and away from said second arm;
   first rigid connecting means having a first end pivotably connected to said first point of attachment and a secnd end pivotably connected to said first arm; and
   second rigid connecting means having a first end pivotably connected to said second point of attachment and a second end pivotably connected to said second arm.

3. A hand cart according to claim 2 wherein said force receiving means includes a first rigid brace pivotably connected to first ends of each of said first and second links and a second rigid brace pivotably connected to second ends of each of said first and second links.

4. A hand cart according to claim 3 comprising a foot pedal secured to each of said braces.

5. A hand cart according to claim 2 comprising support surfaces (46) secured to the frame and disposed adjacent said arms and sized for said arms to opposed said surfaces as said arms pivot about said arm axes.

6. A hand cart according to claim 5 wherein said surfaces are formed of a material having a low coefficient of friction.

7. A hand cart according to claim 6 wherein said material is Teflon.

8. A hand cart according to claim 2 wherein said first and second rigid connecting means include an adjustable length connecting link.

9. A hand cart having a frame and wheel means mounted on said frame, said cart comprising:
   a first side arm pivotably mounted to said frame to pivot about a first arm axis;
   a second side arm pivotably mounted to said frame to pivot about a second arm axis generally parallel to and spaced from said first arm axis;
   a force transmissing means having a first pivot link pivotably mounted to said frame to pivot about a first link axis genersally perpendicular to said arm axes, a second link pivotably mounted to said frame to pivot about a second link axis generally parallel to said first link axis, a first brace having a force receiving surface and pivotably connected to first ends of each of said first and second links, a second brace having a force receiving surface and pivotably connected to second ends of each of said first and second links; said first link, second link, first brace and second brace cooperating to define a parallelogram for pivoting about said link axis between a first and second position with said force receiving surfaces moving in paths generally perpendicular to said link axis without pivoting motion of said surfaces and with a first fixed point of attachment on one of said links moving toward and from said first arm as said links move between said first and second positions and a secod fixed point of attachment on one of said links moving toward and from said second arms;

first rigid connecting means having a first end pivotably connected to said first point of attachment and a second end pivotably connected to said first arm; and second rigid connecting means having a first end pivotably connected to said second point of attachment and a second end pivotably connected to said second arm.

10. A hand cart according to claim 1 comprising support surfaces secured to said frame and disposed adjacent said arms and sized for said arms to oppose said surfaces as said arms pivot.

11. A hand cart according to claim 10 wherein said surfaces are formed of a material having a low coefficient of friction.

12. A hand cart according to claim 11 wherein said material is Teflon.

* * * * *

UNITED STATES PATENT AND TRADEMARK OFFICE
CERTIFICATE OF CORRECTION

PATENT NO. : 4,685,854
DATED : August 11, 1987
INVENTOR(S) : Marshall R. Bulle

It is certified that error appears in the above-identified patent and that said Letters Patent is hereby corrected as shown below:

Column 5, line 46, "indiced" should be --induced--;

Column 6, line 1, "t" should be --to--;

Column 6, line 30, "secnd" should be --second--;

Column 6, line 46, "opposed" should be ---oppose--; and

Column 6, line 63, "transmissing" should be --transmitting--.

Signed and Sealed this

Eighth Day of December, 1987

Attest:

DONALD J. QUIGG

Attesting Officer

Commissioner of Patents and Trademarks